US012561987B2

(12) United States Patent (10) Patent No.: US 12,561,987 B2
Pozsegovics (45) Date of Patent: Feb. 24, 2026

(54) METHOD FOR IDENTIFYING EDGES OF CURBS

(71) Applicant: Robert Bosch GmbH, Stuttgart (DE)

(72) Inventor: Peter Pozsegovics, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 214 days.

(21) Appl. No.: 18/294,087

(22) PCT Filed: Jul. 26, 2022

(86) PCT No.: PCT/EP2022/070995
§ 371 (c)(1),
(2) Date: Jan. 31, 2024

(87) PCT Pub. No.: WO2023/016799
PCT Pub. Date: Feb. 16, 2023

(65) Prior Publication Data
US 2024/0338954 A1      Oct. 10, 2024

(30) Foreign Application Priority Data

Aug. 12, 2021    (DE) ..................... 10 2021 208 827.9

(51) Int. Cl.
*G06T 3/047*        (2024.01)
*G01S 13/88*        (2006.01)
(Continued)

(52) U.S. Cl.
CPC .......... *G06V 20/588* (2022.01); *G01S 13/882* (2013.01); *G01S 13/89* (2013.01); *G06T 3/047* (2024.01)

(58) Field of Classification Search
CPC ..... G06V 20/588; G06T 3/047; G01S 13/882; G01S 13/89
(Continued)

(56) References Cited

U.S. PATENT DOCUMENTS

2010/0017060 A1* 1/2010 Zhang ..................... G01S 17/89
356/3
2015/0332114 A1* 11/2015 Springer ............... B60W 50/14
348/148
(Continued)

FOREIGN PATENT DOCUMENTS

DE      102014017904 A1 *  7/2015  ........... G06V 20/588
DE      102016201304 A1      8/2017
(Continued)

OTHER PUBLICATIONS

Inna Stainvas, Performance Evaluation for Curb Detection Problem, Jun. 11, 2014, 2014 IEEE Intelligent Vehicles Symposium (IV) ( Year: 2014).*

(Continued)

*Primary Examiner* — Matthias S Weisfeld
(74) *Attorney, Agent, or Firm* — NORTON ROSE FULBRIGHT US LLP

(57) ABSTRACT

A method for identifying edges of curbs in an environment of a mobile platform. The method includes: providing at least one optical image of the environment of the mobile platform; determining linear structures in the at least one optical image; providing a topographic profile of a ground surface of the environment of the mobile platform; projecting the linear structures into the topographic profile of the ground surface; verifying the edges of curbs by examining, on both sides of the projected linear structures, the topographic profile for altitude jumps corresponding to a curb structure; connecting the verified altitude jumps in order to identify the edges of the curbs.

9 Claims, 3 Drawing Sheets

(51) Int. Cl.
    *G01S 13/89*     (2006.01)
    *G06V 20/56*     (2022.01)

(58) Field of Classification Search
    USPC .......................................................... 701/28
    See application file for complete search history.

(56)          References Cited

U.S. PATENT DOCUMENTS

| | | | |
|---|---|---|---|
| 2016/0011594 A1* | 1/2016 | Chung | G05D 1/024 |
| | | | 701/28 |
| 2022/0390608 A1* | 12/2022 | Park | G01S 17/931 |

FOREIGN PATENT DOCUMENTS

| | | | | |
|---|---|---|---|---|
| DE | 102016215840 A1 * | 3/2018 | .......... | G06V 20/588 |
| JP | 2014006588 A | 1/2014 | | |

OTHER PUBLICATIONS

Leyang Zhao, The Extraction of Street Curbs from Mobile Laser Scanning Data in Urban Areas, Jun. 19, 2021, MDPI, Remote Sensing (Year: 2021).*

International Search Report for PCT/EP2022/070995, Issued Nov. 17, 2022.

Oniga et al., "Curb Detection Based on Elevation Maps From Dense Stereo," Intelligent Computer Communication and Processing, 2007 IEEE International Conference on, IEEE, 2007, pp. 119-125. <https://sci-hub.ru/10.1109/iccp.2007.4352150> Downloaded Jan. 30, 2024.

Catalina Deac et al., "Curb Detection in Urban Traffic Scenarios Using Lidars Point Cloud and Semantically Segmented Color Images," 2019 IEEE Intelligent Transportation Systems Conference (JTSC), IEEE, 2019, pp. 3433-3440. <https://sci-hub.ru/10.1109/itsc.2019.8917020> Downloaded Jan. 30, 2024.

* cited by examiner

METHOD FOR IDENTIFYING EDGES OF CURBS

BACKGROUND INFORMATION

For the control of at least partially automated systems, such as self-driving vehicles or robots as examples of mobile platforms, safe and effective operation requires interpretation of the environment of the mobile platform for, for example, decision-making processes such as trajectory planning and trajectory control of the mobile platforms.

An important component of such, at least partially automated, systems is their ability to perceive complex situations with respect to their environment, so that they can adapt these to the respective task.

Wheels of such mobile platforms are very important components for correct functioning and must therefore have a correct state. Damage to the wheels or the rims is more likely in certain driving situations; a parking situation directly next to a curb can be regarded as particularly critical.

SUMMARY

There are obstacles that, with respect to damage, are particularly relevant for wheels of such a mobile platform—since they extend upwards from a ground surface of the mobile platform, such as curbs, and can therefore damage the wheels, which stand on the ground surface—or the associated rims. In order to determine whether such an obstacle object is at a relevant, and possibly critical, distance from such a wheel, it must be identified by the mobile platform.

Specified according to the present invention are methods for identifying edges of curbs in an environment of a mobile platform, a system for identifying edges of curbs in an environment of a mobile platform, and a use of the system, which at least in part have the mentioned effects. Advantageous embodiments of the present invention are disclosed herein.

Throughout this description of the present invention, the sequence of method steps is shown in such a way that the method is easy to understand. However, a person skilled in the art may recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

According to one aspect of the present invention, a method for identifying edges of curbs in an environment of a mobile platform is provided. According to an example embodiment of the present invention, the method includes the following steps. In one step, at least one optical image of the environment of the mobile platform is provided. In a further step, linear structures in the at least one optical image are determined. In a further step, a topographic profile of a ground surface of the environment of the mobile platform is provided. In a further step, the linear structures are projected into the topographic profile of the ground. In a further step, the edges of curbs are verified by examining, on both sides of the projected linear structures, the topographic profile for altitude jumps corresponding to a curb structure. In a further step, the verified altitude jumps are connected in order to identify the edges of the curbs.

In other words, in the method, structures of edges of curbs, which can be approximated as straight lines in most cases, are determined by means of, for example, a calibrated fisheye camera system. Due to the calibration of the camera system, the position of the camera system can be determined in world coordinates, so that the linear structures of the edges of curbs from the at least one optical image can be transformed or projected into the topographic profile of the ground surface of the environment of the mobile platform so that the determined linear structures of the edges of curbs can be verified in a three-dimensional world coordinate representation.

According to an example embodiment of the present invention, for this purpose, the topographic profile can be subdivided into grid cells by means of a flat grid in order to mathematically aggregate, e.g., by averaging, a multitude of topographic points, which can, for example, be determined by means of three-dimensional triangulation, within a grid cell in order to assign them to the respective grid cell—for example, in an x-y plane. Edges of curbs in the environment of the mobile platform can thus be detected on a grid-raster basis.

Since the curbs themselves can be clearly characterized in a static environment by their altitude values, different altitude values accordingly result for the individual grid cells of the topographic profile depending upon whether the topographic profile represents a ground surface, on which the mobile platform can drive, or a curb with a resulting elevated plane.

The curbs in the grid cells of the flat grid are thus clearly represented, and the edges of the curbs, which indicate a transition of the ground surface to the curb, can be identified.

For this purpose, the edges of curbs can be verified by examining the topographic profile for altitude jumps on both sides of the projected linear structure. If an altitude difference can be determined between the two sides of the projected linear structure, the linear structure can be verified as a valid curb object.

Thus, in the method for identifying edges of curbs according to an example embodiment of the present invention, an identification of the edges of curbs advantageously results without having to carry out a measurement, such as a line triangulation—in particular, with respect to the height and the distance of a curb. The method can in particular be realized by suitable evaluation of data, which can be provided by optical camera systems; the method is therefore simple and can be implemented effectively.

According to one aspect of the present invention, it is provided that the verification of the edges of curbs be carried out by means of an edge filter kernel.

By means of an edge filter kernel, a convolutional method can be used to verify the edges of curbs by moving the edge filter kernel over the entire flat grid in order to identify the corresponding edges. Such an edge filter kernel identifies a group of grid cells that can be connected, or clustered, in order to identify the edges of the curbs.

Advantageously, by using the edge filter kernel, edges of curbs can be identified even in regions of the flat grid in which no linear structures were projected.

According to one aspect of the present invention, it is proposed that the verification of the edges of curbs by means of the edge filter kernel be carried out in an environment of the projected linear structures.

Due to the fact that the projected linear structures preselect possible edges of curbs, the method can be more effective, since the entire flat grid does not have to be scanned by means of the edge filter kernel.

According to one aspect of the present invention, it is provided that the linear structures of the at least one optical image be transformed into world coordinates for the projection into the topographic profile of the ground.

Advantageously, the linear structures can thereby be simply compared to the topographic profile.

For providing the optical image of the environment of the mobile platform, a calibrated fisheye camera and/or a calibrated near-range camera and/or another calibrated video camera and/or a multitude of these camera systems can, for example, be used. In this case, such a calibrated camera system makes it possible to transform image coordinates of the respective camera system into world coordinates.

According to one aspect of the present invention, it is provided that a distance of a wheel from the verified edges of the curbs be determined by comparing the optical camera, calibrated to the world coordinates of the topographic profile, and its position Substitute Specification relative to the respective wheels of the mobile platform to the identified edges of the curbs in world coordinates. In this respect, the distance of a respective wheel from an edge of a curb can be defined as the shortest distance between the respective nearest wheel and the respective edge of the curb.

According to one aspect of the present invention, it is provided that the topographic profile be subdivided with a flat grid, and the linear structures be projected into a corresponding topographic profile aggregated by grid cell. In the topographic profile aggregated by grid cell, the topographic profile is subdivided into grid cells by means of a flat grid, and the points of the topographic profile within a grid cell are mathematically aggregated—for example, by averaging.

According to one aspect of the present invention, it is provided that the provided topographic profile have been determined by means of an optical camera system and/or a lidar system and/or a radar system. Advantageously, the accuracy can thereby be increased by generating the topographic profile by means of different imaging systems, for example.

According to one aspect of the present invention, it is provided that the provided topographic profile have been generated by means of a structure-by-motion method. Advantageously, the entire method can thereby be realized by evaluating data from camera systems.

According to one aspect of the present invention, it is provided that the linear structures in the at least one optical image be determined by means of contrast differences in the at least one optical image.

According to one aspect of the present invention, it is provided that the linear structures in the at least one optical image be determined by means of a linear structure of an upper edge of the curb and a linear structure of a lower edge of the curb by projecting the linear structure of the upper edge onto a virtual ground surface and by comparing a first triangle, which is formed from the upper edge of the curb, the lower edge of the curb, and the projected line of the upper edge of the curb onto the virtual ground, to a second triangle, which is formed from a camera position, a perpendicular projection of the camera position onto the ground surface, and the lower edge of the curb, with respect to similar triangles.

Since the first triangle and the second triangle must be similar triangles when edges of curbs are correctly determined, the identification of the edges of the curbs can be checked and/or improved with these method steps.

According to one aspect of the present invention, it is provided that the verified edge of the curb be tracked by a system of the mobile platform over an identification time period in order to determine incorrect identifications of the edges of curbs. Advantageously, the certainty is thereby improved that edges of the curbs are correctly identified, and incorrect detections can be reduced by tracking the identified edges of the curbs with conventional methods over a certain time period—for example, as long as the respective edges of the curbs are in the relevant environment of the mobile platform.

According to one aspect of the present invention, it is provided that the flat grid be formed in an environment of the mobile platform that is relevant to the identification of edges of curbs, and be constructed in the direction of change when the relevant environment changes, and be removed against the direction of change in order to limit a size of the flat grid.

Advantageously, the storage effort—in particular, for the values assigned to the grid cells—can thereby be reduced by maintaining the flat grid in a region around the mobile platform corresponding to a direction of movement of the mobile platform. For this purpose, values of grid cells that are no longer relevant can be discarded, and the storage spaces for these grid cells can be used for grid cells located in the driving direction.

According to an example embodiment of the present invention, a system for identifying edges of curbs in an environment of a mobile platform is provided, with an optical camera system, which is mechanically coupled to the mobile platform and is configured to provide at least one optical image of the environment of the mobile platform. Furthermore, the system for identification contains an imaging system, which is configured to generate a topographic profile of a ground surface of the environment of the mobile platform. In addition, the system for identification contains a data processing device, which is coupled in terms of signals to the optical camera system and to the imaging system, and which is configured by means of a computing unit and/or a system-on-chip to carry out one of the methods described above for identifying edges of curbs in an environment of a mobile platform, in order to identify edges of curbs.

According to one aspect of the present invention, it is provided that the imaging system of the system for identification be an optical camera system and/or a lidar system and/or a radar system, and the imaging system be configured to provide a topographic profile of a ground surface of the environment of the mobile platform.

A use of the above-described system for identification for identifying edges of curbs for a mobile platform is provided according to the present invention.

In this respect, the term, "mobile platform," can be understood to mean an at least partially automated system that is mobile, and/or a driver assistance system of a vehicle. An example can be an at least partially automated vehicle or a vehicle with a driver assistance system. That is, in this context, an at least partially automated system includes a mobile platform with respect to at least partially automated functionality, but a mobile platform also includes vehicles and other mobile machines including driver assistance systems. Other examples of mobile platforms may include multi-sensor driver assistance systems, multi-sensor mobile robots such as robotic vacuum cleaners or lawn mowers, a multi-sensor monitoring system, a manufacturing machine, a personal assistant, or an access control system. Each of such systems can be a fully or partially automated system.

BRIEF DESCRIPTION OF THE DRAWINGS

Exemplary embodiments of the present invention are shown in FIGS. 1A-1C, 2, and 3 and are explained in more detail below.

DETAILED DESCRIPTION OF EXAMPLE EMBODIMENTS

Figures 1A, 1B, 1C:
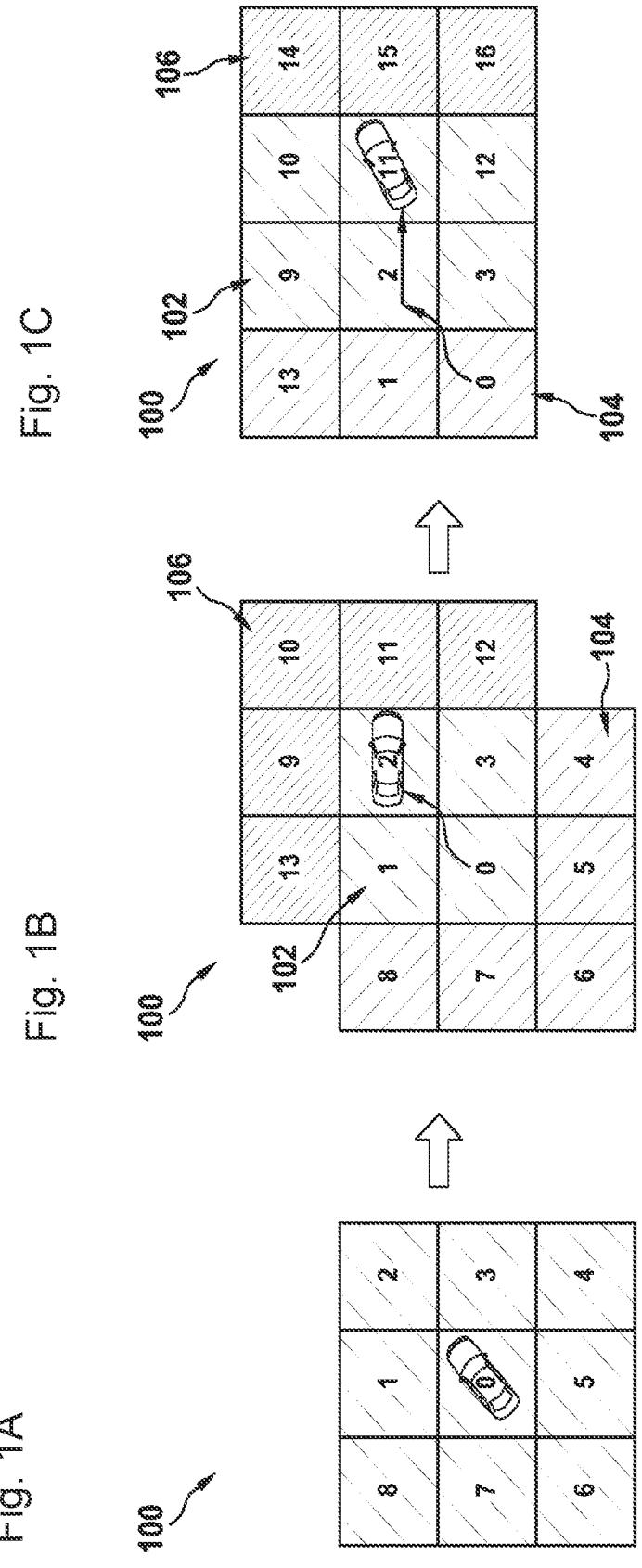
FIGS. 1A-1C show a flat grid with grid cells for the topographic profile in a relevant environment of a mobile platform, according to an example embodiment of the present invention.

FIGS. 1A to 1C schematically show how the flat grid 100 is formed in an environment of the mobile platform that is relevant to the identification of edges of curbs, which mobile platform is represented here as a plan view of a vehicle, and how the grid is constructed in the direction of change when the relevant environment changes.

FIG. 1A schematically shows the mobile platform in the zero position of the flat grid, which is shown here with nine grid cells 102, in world coordinates, wherein the mobile platform moves further into the grid cell 2 on a trajectory. In FIG. 1B, in the driving direction and in the relevant environment of the mobile platform, further grid cells 106 are added to the grid cells 102 and, against the direction of change, the grid cells 104 are removed in order to limit a size of the flat grid. In FIG. 1C, the mobile platform moves further into the grid cell 11 so that new grid cells 106 in the driving direction and in the relevant environment of the mobile platform are added, and other grid cells 104 against the direction of change are correspondingly removed.

Figure 2:
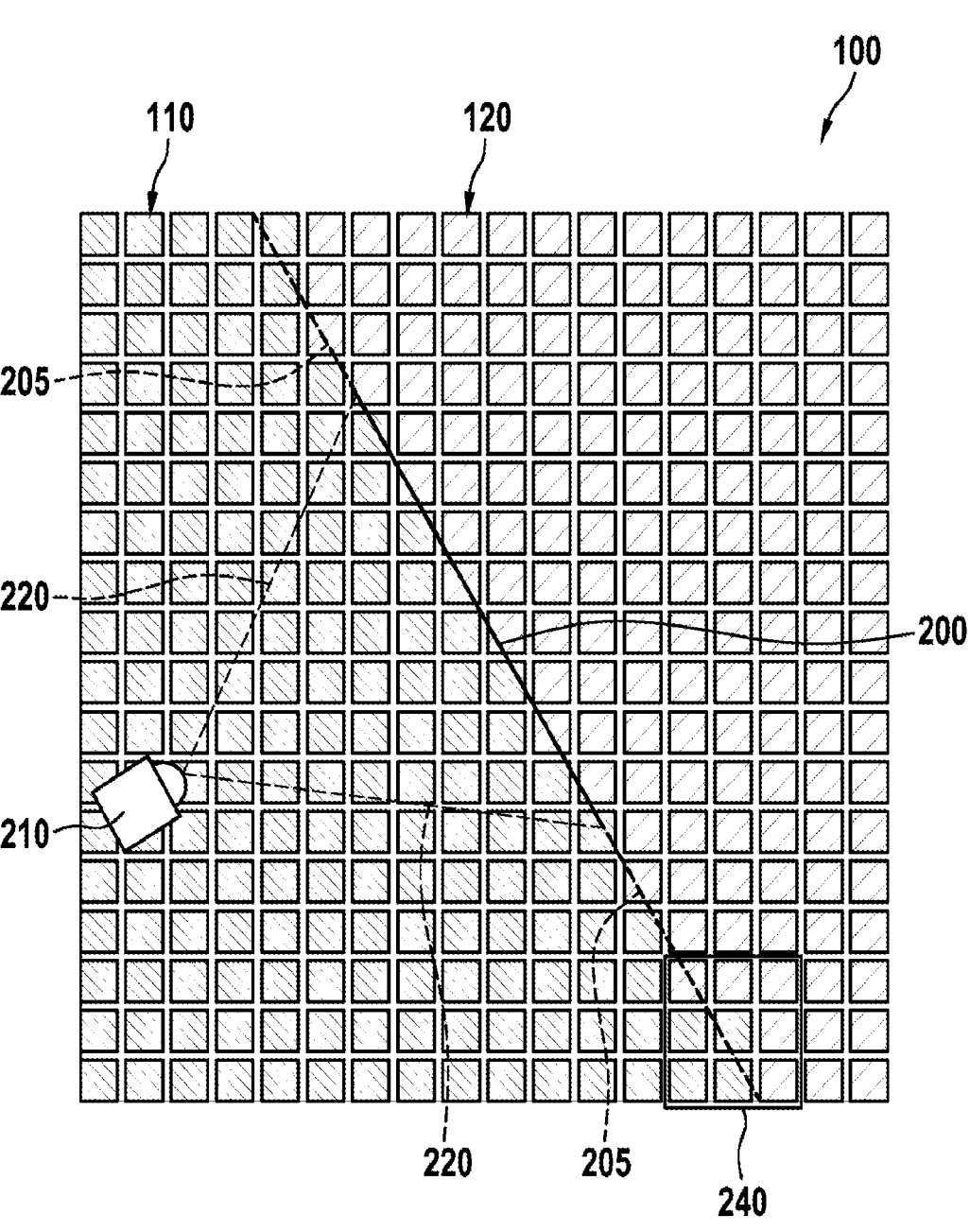
FIG. 2 shows a plan view of a flat grid for a topographic profile in a relevant environment of a mobile platform with a projected linear structure, according to an example embodiment of the present invention.

FIG. 2 schematically shows a plan view of a flat grid 100 for a topographic profile in a relevant environment of a mobile platform, which is mechanically coupled to a camera 210 with the viewing angle 220 and is calibrated with respect to world coordinates, with a projected linear structure 200.

For the method for identifying edges of curbs in an environment of a mobile platform, an optical image of the environment of the mobile platform is provided by means of the camera 210. In a further step, a linear structure 200 in the at least one optical image is determined. In a further step, a topographic profile 100 of a ground surface of the environment of the mobile platform is provided. In this case, the topographic profile 100 is subdivided by means of a flat grid, and the linear structure 200 is projected into a corresponding topographic profile 100 aggregated by grid cell.

In the topographic profile aggregated by grid cell, the topographic profile 100 is subdivided into a multitude of grid cells by means of a flat grid, and the points of the topographic profile within a respective grid cell are mathematically aggregated—for example, by averaging. An aggregated value 110, 120 of the topographic profile is thus assigned to the respective grid cell. The linear structure 200 is projected into the topographic profile 100 of the ground, or the ground surface, of the environment of the mobile platform. The edges of curbs are verified by examining, on both sides of the projected linear structure 200, the topographic profile 100 for altitude jumps 110, 120 corresponding to a curb structure. In this case, the grid cells 120 are at the level of curbs, and the grid cells 110 are at the level of a ground surface on which the mobile platform stands. These verified altitude jumps can be connected in order to identify the edges of the curbs.

In other words, the grid cells have unique features with respect to altitude values assigned to them by means of the aggregation of the topographic profile. If a projected structure is identified around such an altitude jump, it can be considered part of an edge of curbs.

A verification of an edge of curbs 205 that is not recorded by the camera system 210 can be carried out by means of an edge filter kernel 240. With the edge filter kernel, an edge 205 of curbs can be verified with a convolutional method applied to the topographic profile 100 aggregated by grid cell, by moving the edge filter kernel over the entire flat grid 100 with the altitudes of the grid cells 110, 120 in order to identify the corresponding edges. Alternatively or additionally, the convolutional method with the edge filter kernel 240 can be applied to an environment of the projected linear structure 200 and can thus be more effective, since the entire flat grid 100 does not have to be scanned by means of the edge filter kernel 240.

Figure 3:
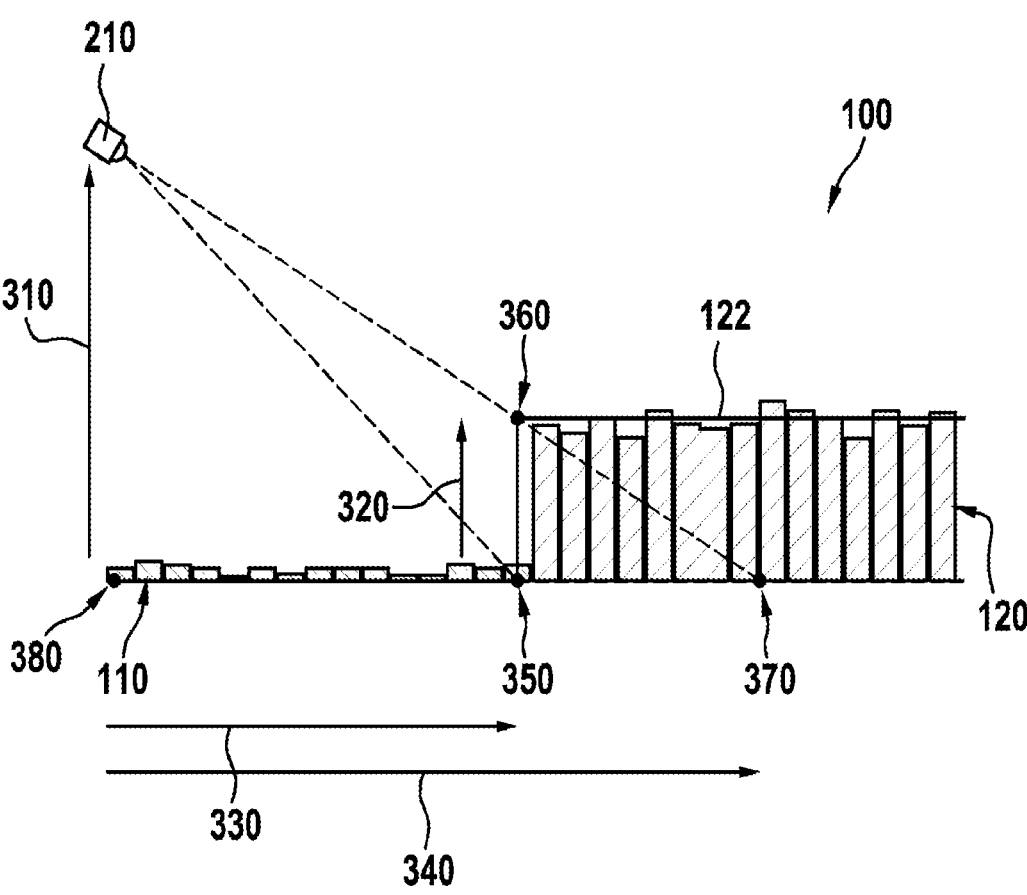
FIG. 3 shows a side view of a flat grid for a topographic profile in a relevant environment of a mobile platform with similar triangles for determining a linear structure.

FIG. 3 schematically shows a side view of a flat grid for a topographic profile 100 in a relevant environment of a mobile platform with similar triangles for determining a linear structure at the position 350. In this case, the grid cells 110 characterize a ground surface for the mobile platform, and the grid cells 120, for which an average value 122 is shown, characterize a height of the curb.

By comparing two similar triangles in the geometry shown, the identification of the edges of the curbs can be checked and/or improved.

For this purpose, the two linear structures in the at least one optical image must be determined, wherein one of the linear structures is an upper edge of the curb, and a further linear structure is a lower edge of the curb.

The first triangle is determined from a point 370, which is generated in that the upper edge of the curb 360 is projected onto a ground surface 110 that is virtually lengthened to under the curb surface, from the upper edge of the curb 360, and the lower edge of the curb 350.

The second triangle is determined from a camera position 210, a perpendicular projection of the camera position onto the ground surface 380, and the lower edge of the curb 350. According to the geometry shown, the first triangle 360, 370, 350 with the leg lengths 340 minus 330, 320, and 370 minus 360 and the second triangle 210, 350, 380 with the leg lengths 330, 310, and 350 minus 210 should be similar triangles when the edge of curbs is correctly determined. These method steps thus make it possible to check and/or improve the identification of the edges of the curbs, e.g., by generating a second altitude value of the edge of curbs, in order to check an edge of curbs that was determined with the other method.

The invention claimed is:

1. A method for identifying edges of curbs in an environment of a mobile platform, comprising the following steps:
   providing at least one optical image of the environment of the mobile platform;
   determining linear structures in the at least one optical image, wherein the linear structures in the at least one optical image are determined using a linear structure of an upper edge of a curb and a linear structure of a lower edge of the curb by projecting the linear structure of the upper edge onto a virtual ground surface, and by comparing a first triangle, which is formed from the upper edge of the curb, the lower edge of the curb, and the projected line of the upper edge of the curb onto a virtual ground, to a second triangle, which is formed from a camera position, a perpendicular projection of the camera position onto a ground surface, and the lower edge of the curb, with respect to similar triangles;

providing a topographic profile of a ground surface of the environment of the mobile platform, wherein the provided topographic profile was determined using an optical camera system and/or a lidar system and/or a radar system, wherein the topographic profile indicates altitude values of a two-dimensional surface;

projecting the linear structures into the topographic profile of the ground surface, wherein the linear structures of the at least one optical image are transformed into world coordinates for the projection into the topographic profile of the ground surface;

verifying the edges of curbs by examining, on both sides of the projected linear structures, the topographic profile for altitude jumps corresponding to a curb structure; and connecting the verified altitude jumps in order to identify the edges of the curbs.

2. The method according to claim 1, wherein the verification of the edges of curbs is carried out using an edge filter kernel.

3. The method according to claim 2, wherein the verification of the edges of curbs is carried out using the edge filter kernel in an environment of the projected linear structures.

4. The method according to claim 1, wherein the provided topographic profile was generated using a structure-by-motion method.

5. The method according to claim 1, wherein the linear structure of the upper edge of the curb and the linear structure of the lower edge of the curb in the at least one optical image are determined using contrast differences in the at least one optical image.

6. The method according to claim 1, wherein the verified edge of the curb is tracked by a system of the mobile platform over an identification time period in order to determine incorrect identifications of edges of curbs.

7. The method according to claim 1, wherein a flat grid is formed in the environment of the mobile platform that is relevant to the identification of edges of curbs, and is constructed in a direction of change when the environment changes, and is removed against the direction of change in order to limit a size of the flat grid.

8. A system for identifying edges of curbs in an environment of a mobile platform, comprising:

an optical camera system, which is mechanically coupled to the mobile platform and configured to provide at least one optical image of the environment of the mobile platform;

an imaging system configured to generate a topographic profile of a ground surface of the environment of the mobile platform, the imaging system including the optical camera system and/or a lidar system and/or a radar system, wherein the topographic profile indicates altitude values of a two-dimensional surface; and a data processing device, which is coupled in terms of signals to the optical camera system and to the imaging system, and which is configured using a computing unit and/or a system-on-chip to:

determine linear structures in the at least one optical image, wherein the linear structures in the at least one optical image are determined using a linear structure of an upper edge of a curb and a linear structure of a lower edge of the curb by projecting the linear structure of the upper edge onto a virtual ground surface, and by comparing a first triangle, which is formed from the upper edge of the curb, the lower edge of the curb, and the projected line of the upper edge of the curb onto a virtual ground, to a second triangle, which is formed from a camera position, a perpendicular projection of the camera position onto a ground surface, and the lower edge of the curb, with respect to similar triangles;

project the linear structures into the topographic profile of the ground surface, wherein the linear structures of the at least one optical image are transformed into world coordinates for the projection into the topographic profile of the ground surface;

verifying the edges of curbs by examining, on both sides of the projected linear structures, the topographic profile for altitude jumps corresponding to a curb structure; and connecting the verified altitude jumps in order to identify the edges of the curbs.

9. A method, comprising:

providing a system for identifying edges of curbs in an environment of a mobile platform, including:

an optical camera system, which is mechanically coupled to the mobile platform and configured to provide at least one optical image of the environment of the mobile platform, an imaging system configured to generate a topographic profile of a ground surface of the environment of the mobile platform, the imaging system including the optical camera system and/or a lidar system and/or a radar system, wherein the topographic profile indicates altitude values of a two-dimensional surface, and a data processing device, which is coupled in terms of signals to the optical camera system and to the imaging system, and which is configured using a computing unit and/or a system-on-chip to:

determine linear structures in the at least one optical image, wherein the linear structures in the at least one optical image are determined using a linear structure of an upper edge of a curb and a linear structure of a lower edge of the curb by projecting the linear structure of the upper edge onto a virtual ground surface, and by comparing a first triangle, which is formed from the upper edge of the curb, the lower edge of the curb, and the projected line of the upper edge of the curb onto a virtual ground, to a second triangle, which is formed from a camera position, a perpendicular projection of the camera position onto a ground surface, and the lower edge of the curb, with respect to similar triangles, project the linear structures into the topographic profile of the ground surface, wherein the linear structures of the at least one optical image are transformed into world coordinates for the projection into the topographic profile of the ground surface, verify the edges of curbs by examining, on both sides of the projected linear structures, the topographic profile for altitude jumps corresponding to a curb structure, and connect the verified altitude jumps in order to identify the edges of the curbs; and using, by the mobile platform, the provided system.

* * * * *